US006384919B1

(12) United States Patent
Fersht et al.

(10) Patent No.: US 6,384,919 B1
(45) Date of Patent: May 7, 2002

(54) FIBER OPTIC SEISMIC SENSOR

(75) Inventors: Samuel N. Fersht, Studio City; David B. Hall, La Crescenta; Carl Bathelt, Simi Valley, all of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 44 days.

(21) Appl. No.: 09/697,999

(22) Filed: Oct. 25, 2000

Related U.S. Application Data
(60) Provisional application No. 60/162,702, filed on Oct. 29, 1999.

(51) Int. Cl.[7] ............................. G01P 15/00; G01B 9/02
(52) U.S. Cl. ..................................... 356/477; 73/514.26
(58) Field of Search ...................... 356/477; 73/514.26; 181/122

(56) References Cited

U.S. PATENT DOCUMENTS

| 4,932,258 A | 6/1990 | Norling |
| 4,959,539 A | 9/1990 | Hofler et al. |
| 5,287,332 A | 2/1994 | Lea |
| 5,317,929 A | 6/1994 | Brown et al. |
| 5,883,308 A | 3/1999 | Fersht |
| 5,903,349 A * | 5/1999 | Vohra et al. ................. 356/345 |

* cited by examiner

Primary Examiner—Frank G. Font
Assistant Examiner—Phil Natividad
(74) Attorney, Agent, or Firm—Lynn & Lynn

(57) ABSTRACT

A fiber optic seismic sensor includes a central support assembly formed of a metal such as aluminum. A support plate has an inner portion retained within the central support assembly and an outer portion that extends beyond the central support assembly. A pair of hollow cylindrical substrates are mounted in axial alignment on opposite sides of the outer portion of the support plate with the central support assembly extending through the centers of the substrates. The central support assembly comprises a first central support member having a cavity in one end, and a second central support member having a projection extending therefrom and arranged to be received within the cavity in the first central support member. The support plate includes a passage arranged to receive the projection such that the inner portion of the support plate is retained between the first and second central support members. A first spiral-wound optical fiber coil is formed on an outer end of the first substrate, and a second spiral-wound optical fiber coil is formed on an outer end of the second substrate. An interferometer includes the first spiral-wound optical fiber coil in a first leg and the second spiral-wound optical fiber coil in a second leg. Acceleration along an axis perpendicular to the planes of the optical fiber coils causes a deflection in the support plate, which changes the pathlength difference between the legs of the interferometer.

4 Claims, 4 Drawing Sheets

FIBER OPTIC SEISMIC SENSOR

This application claims benefit of provisional No. 60/162,702 filed Oct. 29, 1999.

BACKGROUND OF THE INVENTION

This invention relates generally to apparatus for sensing linear acceleration. More particularly, this invention pertains to a seismic sensor that includes a fiber optic interferometer arranged to provide an optical signal in response to seismic vibrations.

The measurement of flexure or deformation of an elastic disk in response to acceleration or pressure comprises the operating principle of numerous acceleration and pressure sensors. The amount of deformation or displacement can be determined interferometrically, mechanically, piezoelectrically or by changes in the capacitance or inductance between elements. However, all such systems have deficiencies such as limited sensitivity, high cost, limited maximum deflection and operating environment sensitivities. Some errors due to operating conditions are fundamental, such as limited physical flexure capacity in response to acceleration that renders the desired output indistinguishable from signal components associated with noise sources. Other operating condition errors can result from changes in physical dimension, modulus of elasticity, index of refraction, etc., occasioned by temperature and pressure changes.

Interferometric strain measurements exhibit superior accuracy and resolution. When carried out by means of an optical fiber, interferometric systems include simple and rugged sensor devices with low power requirements, immunity to electromagnetic interference and ready adaptability to remote sensing and high data rates. Interferometric measurements of acceleration and pressure employing an optical fiber medium can be accomplished through telemetric signal transmission of a multitude of sensors in a single fiber using time division multiplexing. The fibers are themselves relatively insensitive per unit length and not subject to errors due to ambient pressure, tension from acceleration, etc.

A number of acceleration measurement devices have been developed that utilize disk-mounted spiral coils of optical fiber to produce a desirable push-pull effect. U.S. Pat. No. 4,959,539, issued Sep. 25, 1990 to Hofler et al., discloses a hydrophone having a disk circumferentially supported for flexure induced by acoustic vibrations. A flat spiral of optical fiber is fixed to each side of the disk and arranged as the two legs of an interferometer. Flexure of the disk shortens the optical path length of the spiral on one surface while lengthening it on the oppositely-facing surface. A pair of the disks may be mounted on a body so that an acoustic pressure differential to be measured exists across the disks with the spirals being connected for push-pull operation as two legs of a fiber optic interferometer.

U.S. Pat. No. 5,317,929, issued Jun. 7, 1994 to Brown et al., discloses a fiber optic accelerometer based upon the double disk structure described above. A centrally-located mass is clamped between the opposed flexible disks. Flat spiral coils of optical fiber are fixed to the surfaces of flexible disks and are arranged to be included in the legs of an interferometer.

U.S. Pat. No. 5,883,308, issued Mar. 16, 1999 to Fersht, one of the present inventors, discloses a fiber optic accelerometer that includes a ring that twists in response to an acceleration that is orthogonal to the plane of the ring. The ring is mounted by means of a peripheral flange to the walls of a casing. The casing has two concentric walls that divide the interior of the casing into a disk-like central section and an annular surrounding section. The ring is arranged to have a moment of inertia that causes the ring to twist in response to linear acceleration along the input axis. Flat spiral optical fiber coils are fixed to the top and bottom of the ring and are arranged to be included in the legs of an interferometer for generating an optical signal that may be processed to determine the acceleration. The central portion of the casing is hollow to make the device neutrally buoyant so that it is suitable for use in under-water acoustic sensing applications. The disclosure of U.S. Pat. No. 5,883,308 is hereby incorporated by reference into the present disclosure.

SUMMARY OF THE INVENTION

A fiber optic seismic sensor according to the present invention comprises a central support assembly that is preferably formed of a metal such as aluminum. A support plate has an inner portion retained within the central support assembly and an outer portion that extends beyond the central support assembly. A first substrate has an inner end mounted on a first side of the outer portion of the support plate. The first substrate is formed generally as a hollow cylinder with an inner radius and an outer radius and an inner wall and an outer wall with the inner radius being dimensioned to receive the central support assembly inside the first substrate such that the central support assembly and the inner wall of the first substrate are spaced apart. A second substrate has an inner end mounted on a second side of the outer portion of the support plate. The second substrate is formed generally as a hollow cylinder with an inner radius and an outer radius and an inner wall and an outer wall. The inner radius is dimensioned to receive the central support assembly inside the second substrate such that the central support assembly and the inner wall of the second substrate are spaced apart. A first spiral-wound optical fiber coil is formed on an outer end of the first substrate and a second spiral-wound optical fiber coil is formed on an outer end of the second substrate. The first and second optical fiber coils are arranged such that they are generally flat, concentric and spaced apart. An interferometer is formed to include the first spiral-wound optical fiber coil in a first leg and the second spiral-wound optical fiber coil in a second leg. The interferometer is arranged such that acceleration along an axis perpendicular to the planes of the optical fiber coils causes a deflection in the support plate, which causes an increase in the length of one of the optical fiber coils while causing a corresponding decrease in the pathlength of the other optical fiber coil.

The central support assembly preferably comprises a first central support member having a cavity in a first end thereof, and a second central support member having a projection extending therefrom and arranged to be received within the cavity in the first central support member. The support plate includes a passage arranged to receive the projection therethrough such that the inner portion of the support plate is retained between the first and second central support members.

An appreciation of the objectives of the present invention and a more complete understanding of its structure and method of operation may be had by studying the following description of the preferred embodiment and by referring to the accompanying drawings.

DETAILED DESCRIPTION OF THE PREFERRED EMBODIMENT

Figure 1:
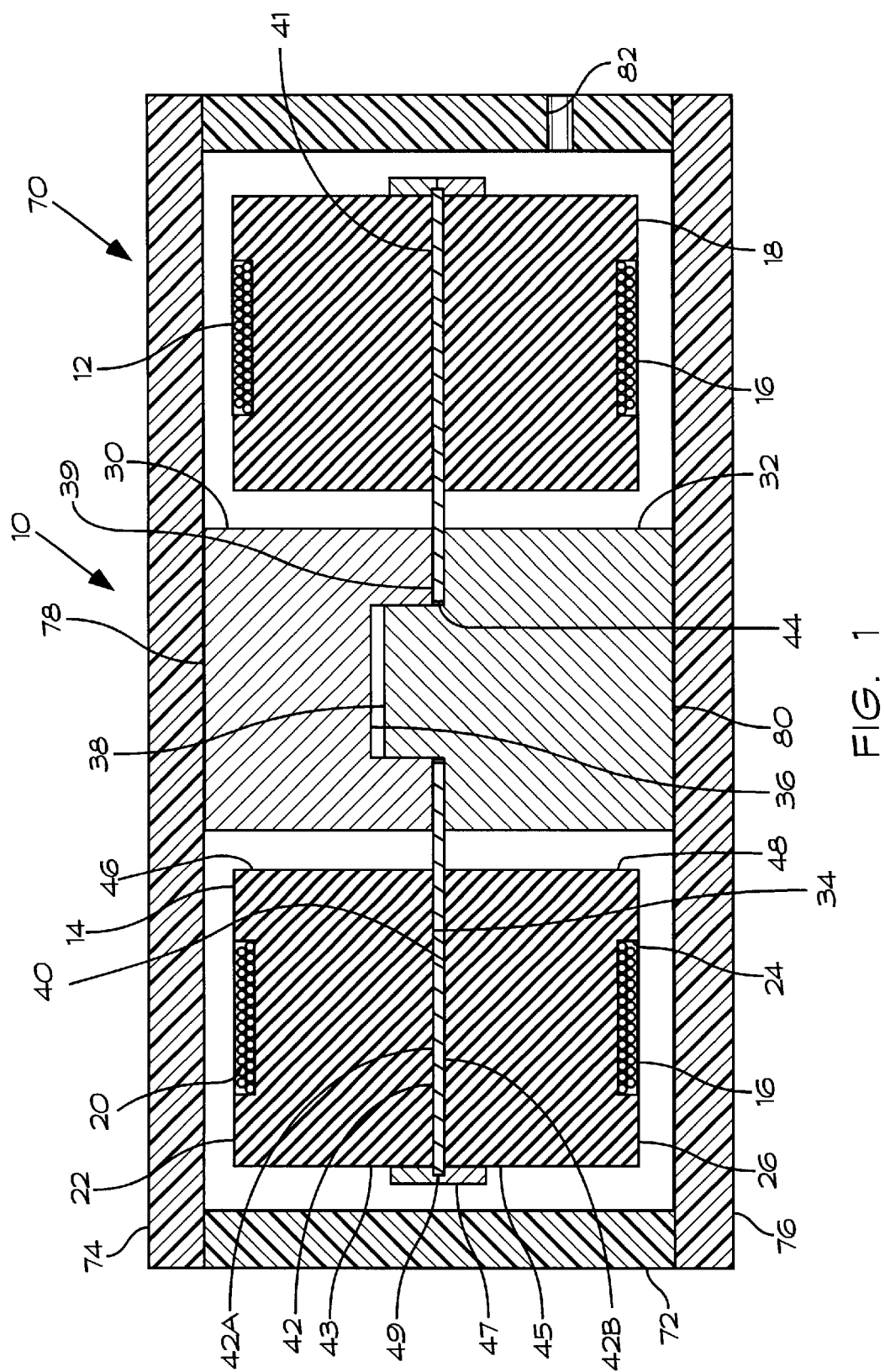
FIG. 1 is a cross sectional view of a fiber optic seismic sensor according to the present invention.
Figure 2:
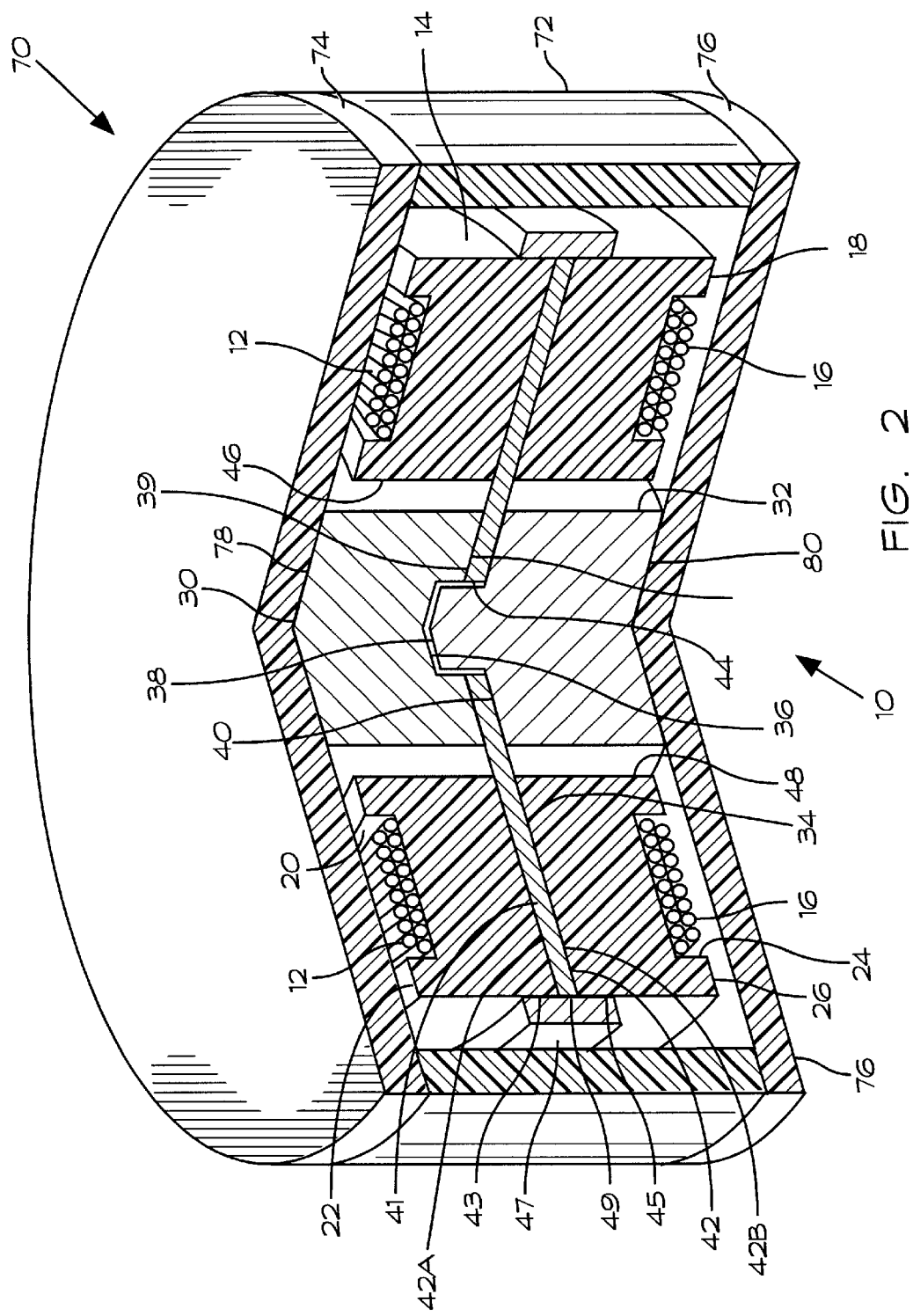
FIG. 2 is a partially sectioned perspective view of the fiber optic seismic sensor of FIG. 1.
Figure 3:
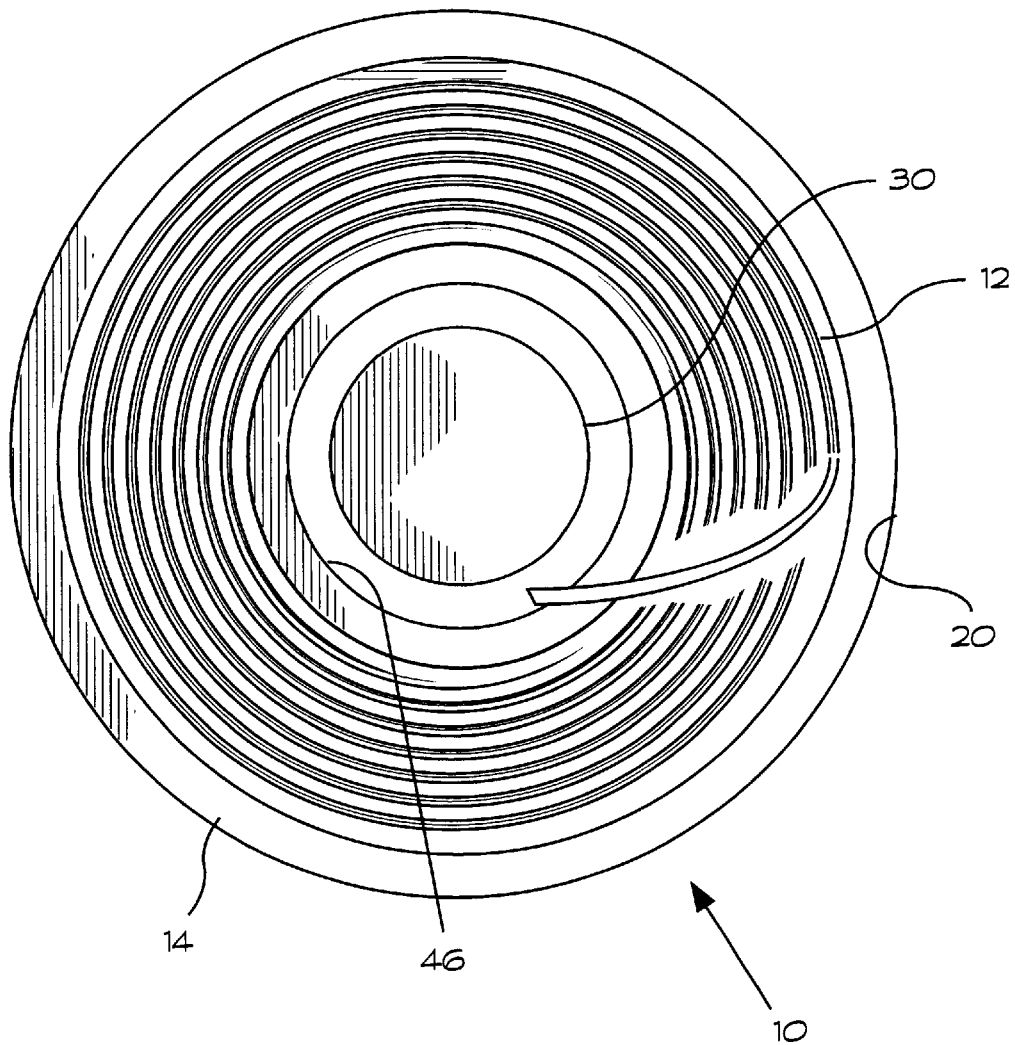
FIG. 3 is a top plan view of a spiral-wound fiber optic coil that may be included in the fiber optic seismic sensor of FIGS. 1 and 2.

FIGS. 1 and 2 illustrate a fiber optic seismic sensor 10 according to the present invention. As shown in FIGS. 1–3, the fiber optic seismic sensor 10 includes a first spiral-wound optical fiber coil 12 mounted on a substrate 14. A second spiral-wound optical fiber coil 16 is mounted on a substrate 18. The substrates 14 and 18 preferably are formed of a material such as polycarbonate.

The first spiral-wound optical fiber coil 12 is preferably mounted in an annular recess 20 formed in the a first side 22 of the substrate 14. The recess 20 thus has side edges that constrain the inner and outer diameters of the coil 12 and assist in forming it on the substrate 14. The coil 12 preferably is secured to the substrate 14 by a suitable adhesive. The optical fiber coil 16 is similarly mounted in a annular recess 24 formed in a first side 26 of the substrate 18.

The coils 12 and 16 preferably have inner diameters of about 18 mm and outer diameters of about 22 mm The coils 12 and 16 preferably have a number of layers appropriate such that each coil has a length of about 6.0 to 6.2 meters.

The fiber optic seismic sensor 10 further includes a first central support member 30 and a second central support member 32. The central support members 30 and 32 preferably are each formed to be generally cylindrical in shape and are formed of a metal such as aluminum. A first end 34 of the central support member 30 has a cylindrical recess 36 therein, and the second central support member 32 has a corresponding cylindrical projection 38 extending from an end 40. As shown in FIGS. 1 and 2, the recess 36 and projection 38 are arranged so that the projection 38 will fit closely inside the recess 36 when the first and second central support members 30 and 32 are axially aligned with the ends 34 and 40 facing one another.

The fiber optic seismic sensor 10 further includes a support plate 42 that preferably has a generally circular outer periphery. A passage 44 is formed in the center of the support plate 42. The recess 36, the projection 3 8 and passage 44 may be conveniently formed to have cylindrical shapes, although other shapes can be used. The passage 44 is formed to be slightly larger that the diameter of the projection 38.

Assembly of the fiber optic seismic sensor 10 involves placing the support plate 42 on the second central support member 32 with the projection 38 extending through the passage 44. The first central support member 30 is then mounted on the second central support member 32 with the projection 38 extending into the recess 36. The central support members 30 and 32 have outer diameters that are less than the diameter of the support plate 42. Therefore, a portion 39 of the support plate 42 is clamped between the inner ends of 34 and 40 of the central support members 30 and 32, respectively. The portion 41 of the support plate 42 is free to vibrate in response to seismic vibrations along the longitudinal axis of the central support members 30 and 32.

The substrate 14 is preferably formed to be generally cylindrical with a central cylindrical passage 46 therein. The substrate 18 preferably is identical to the substrate 14 and has a central cylindrical passage 48. The substrates 14 and 18 have outer surfaces 43 and 45, respectively.

The passages 46 and 48 have diameters larger than the diameter of the central support members 30 and 32. The substrates 14 and 18 and the support plate 42 all preferably have about the same diameter. Assembly of the fiber optic seismic sensor 10 includes the step of arranging the substrates 14 and 18 so that they are axially aligned with ends 34 and 40, respectively, facing opposite sides 42A and 42B, respectively, of the support plate 42. In such an arrangement, the central support member 30 extends through the central passage 46 in the substrate 14. The central support member 32 extends through the central passage 48 with a portion of the projection 38 extending into the passage 46. A suitable adhesive such as epoxy resin is used to bond the substrates 14 and 18 to the support plate 42.

In some configurations it may be desirable to add a mass 47 to the outer edge 49 of the support plate 42. The mass 47 is may be a ring that is mounted to the outer edges of the support plate 42 and the sides 43 and 45 of the substrates 14 and 18, respectively. The added mass 47 may alternatively be formed integrally with the support plate 42. The added mass 47 increases the scale factor of the fiber optic seismic sensor 10.

The fiber optic seismic sensor 10 may include a housing 70 that may be formed of a metal or a synthetic material. The housing 70 may conveniently be formed of a polycarbonate open ended hollow cylinder 72 and a pair of polycarbonate disks 74 and 76. The length of the assembled central support members 30 and 32 and the support plate 42 should be the same as the height of the cylinder 72. An end 78 of the first central support member 30 is bonded to the center of one side of the disk 74. An end of the cylinder 72 is bonded to the disk 74. The disk 76 is bonded to the other end of the cylinder 72 with the ends 78 and 80 of the central support members 30 and 32, respectively, being in contact with the inner surfaces of the disks 74 and 76. The length of the assembled substrates 14 and 18 and the support plate 42 is less than the height of the cylinder 72. Therefore, the central support members 30 and 32 are securely held between the disks 74 and 76 while there is a space between the first sides 22 and 26 of the substrates 14 and 18, respectively, and the disks 74 and 76 of the housing 70. Thus seismic vibrations along the longitudinal axis of the central support members 30 and 32 will deflect the support plate 42 and change the lengths of the optical fiber coils 12 and 16.

Figure 4:
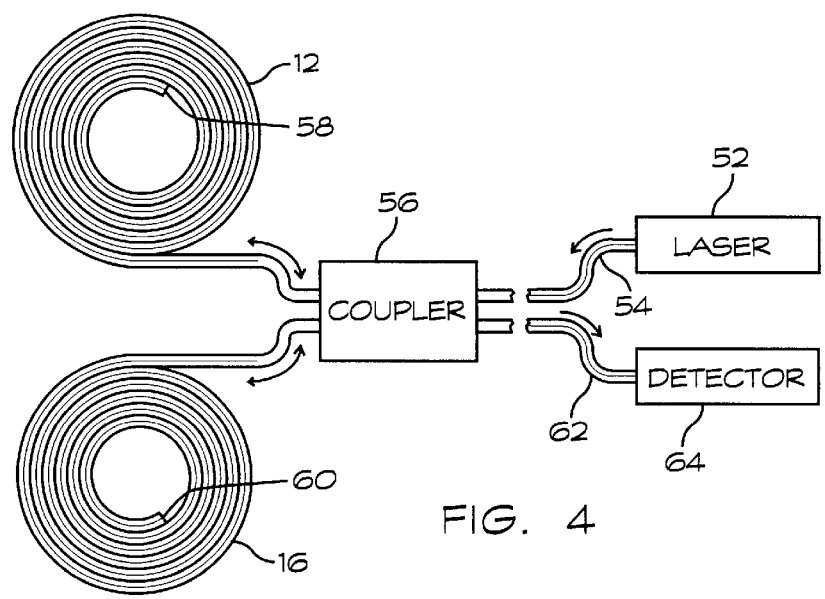
FIG. 4 schematically illustrates an interferometer formed to include a pair of spiral-wound optical fiber coils.

As shown schematically in FIG. 4, the optical fiber coils 12 and 16 are included as the two legs of an interferometer 50. FIG. 4 shows a well-known Michelson interferometer configuration, but the invention can be practiced using a Mach-Zehnder interferometer. A laser 52 provides an optical signal to an optical fiber 54, which guides the optical signal to an optical coupler 56. The coupler 56 may be any suitable coupler structure that is well-known in the art. The coupler output goes to each of the optical fiber coils 12 and 16.

The housing 70 also has an appropriate passage 82 to permit optical fiber to be routed between the components inside and outside the housing 70. In some embodiments of the invention it may be convenient to mount the coupler 56 in the opening as shown in FIG. 1(a) of U.S. Pat. No. 5,883,308.

Seismic vibrations cause deformation of the support plate 42, which changes the lengths of the optical fiber coils 12 and 16. Because the coils 12 and 16 are on opposite sides of the support plate 42, a deflection of the edges of the support plate increases the length of one coil and decreases the length of the other coil. The changes in length produce phase differences in the optical signals propagating in the coils 12 and 16. Reflectors 58 and 60 are formed at the ends of the optical fiber coils 12 and 16 to reflect the optical signals reflect back to the coupler 56 where they combine to produce an interference pattern. An optical fiber 62 guides the interferometer output to a photodetector 64 where the interference pattern is converted into electrical signals. The electrical signals may then be processed to determine the magnitude of the seismic vibration that caused the phase difference between the optical signals in the two legs of the interferometer.

Dimensions of the various components of the fiber optic seismic sensor 10 may vary considerably. Typical dimensions are given herein only by way of example to explain how the fiber optic seismic sensor 10 may be constructed. The substrates 14 and 18 may have diameters of about 26 mm and heights of about 5.4 mm. The recesses 20 and 24 may have widths of about 4 mm and depths of about 0.85 mm. The outer edges of the recesses 20 and 24 preferably are about 2 mm from the outer edges 43 and 45 of the substrates 14 and 18, respectively. The diameters of the passages 46 and 48 in the substrates 14 and 18 may be about 10.0 mm. The central support members 30 and 32 may have diameters of about 8.0 mm and a combined length of about 13.0 mm. The projection 38 may have a diameter of about 4.0 mm and a length of about 1.6 mm. There is a small gap of about 0.4 mm between the end of the projection 38 and the inner edge of the recess 36. The support plate 42 preferably is formed of brass and has an outer diameter of about 26 mm and a thickness of about 0.2 mm. The disks 74 and 76 preferably have thicknesses of about 3.0 mm. The cylinder 72 preferably has a height of about 13.0 mm, a diameter of about 32 mm and a wall thickness of about 2.0 mm.

A fiber optic seismic sensor 10 constructed in accordance with the foregoing description has the capability of detecting seismic vibrations in the frequency range of 3 Hz to 1000 Hz.

Figure 5:
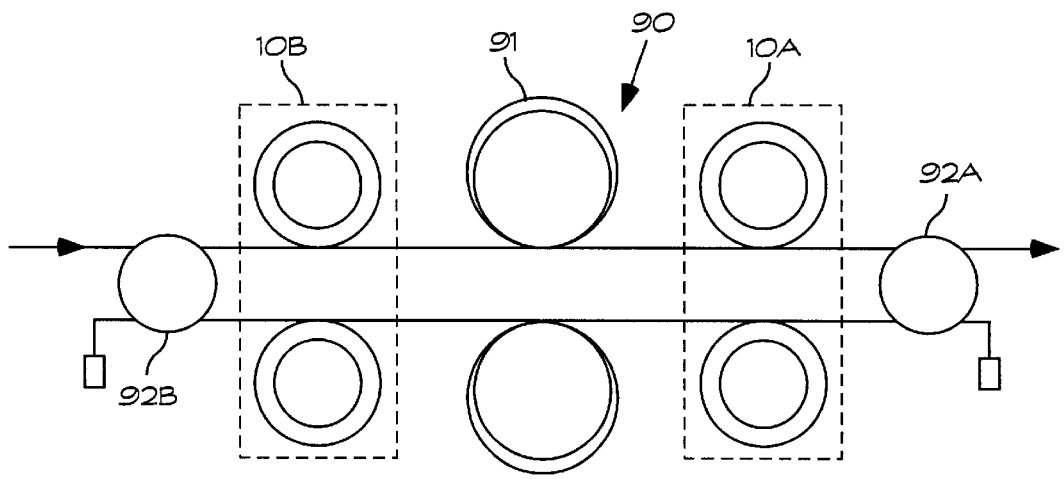
FIG. 5 illustrates a fiber optic seismic sensor system with a cable interlink between successive fiber optic seismic sensors.

A seismic vibration sensing system may include one or more fiber optic seismic sensors 10 according to the present invention. The sensors may be either separate or connected in an array. As shown in FIG. 5 an array 90 may be formed to include a fiber optic telemetry cable 91 connected between successive fiber optic seismic sensors 10A, 10B, etc. Fiber optic couplers 92A, 92B, etc. are connected between the sensors and the telemetry cable. Splices (not shown) are used where necessary to connect the sensors 10A, 10B, etc. to the telemetry cable and to the couplers.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic seismic sensor, comprising:

a central support assembly;

a support plate having an inner portion retained within the central support assembly and an outer portion that extends beyond the central support assembly;

a first substrate having an inner end mounted on a first side of the outer portion of the support plate, the first substrate being formed generally as a hollow cylinder with an inner radius and an outer radius and an inner wall and an outer wall, the inner radius being dimensioned to receive the central support assembly inside the first substrate such that the central support assembly and the inner wall of the first substrate are spaced apart;

a second substrate having an inner end mounted on a second side of the outer portion of the support plate, the second substrate being formed generally as a hollow cylinder with an inner radius and an outer radius and an inner wall and an outer wall, the inner radius being dimensioned to receive the central support assembly inside the second substrate such that the central support assembly and the inner wall of the second substrate are spaced apart;

a first spiral-wound optical fiber coil formed on an outer end of the first substrate;

a second spiral-wound optical fiber coil formed on an outer end of the second substrate, the first and second optical fiber coils being arranged such that they a generally flat, concentric and spaced apart; and an interferometer formed to include the first spiral-wound optical fiber coil in a first leg and the second spiral-wound optical fiber coil in a second leg, the interferometer being arranged such that acceleration along an axis perpendicular to the planes of the optical fiber coils causes a deflection in the support plate, which causes an increase in the length of one of the optical fiber coils while causing a corresponding increase in the pathlength of the other optical fiber coil.

2. The fiber optic seismic sensor of claim 1 wherein the central support assembly comprises:

a housing;

a first central support member mounted to the housing and having a cavity formed therein;

a second central support member having a projection extending therefrom and arranged to be received within the cavity in the first central support member, the support plate including a passage arranged to receive the projection therethrough such that the inner portion of the support plate is retained between the first and second central support members.

3. The fiber optic seismic sensor of claim 2 wherein there is gap between the inner end of the projection and the first central support member.

4. The fiber optic seismic sensor of claim 1, further comprising an inertia ring mounted around the outer periphery of the support plate.

* * * * *